April 3, 1951 — R. C. ZEIDLER — 2,547,427
CLUTCH DISK
Filed Aug. 15, 1946 — 2 Sheets-Sheet 1
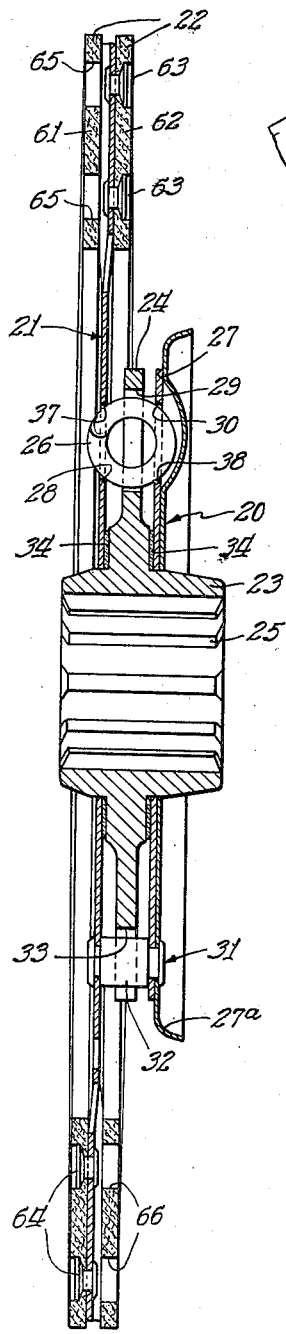
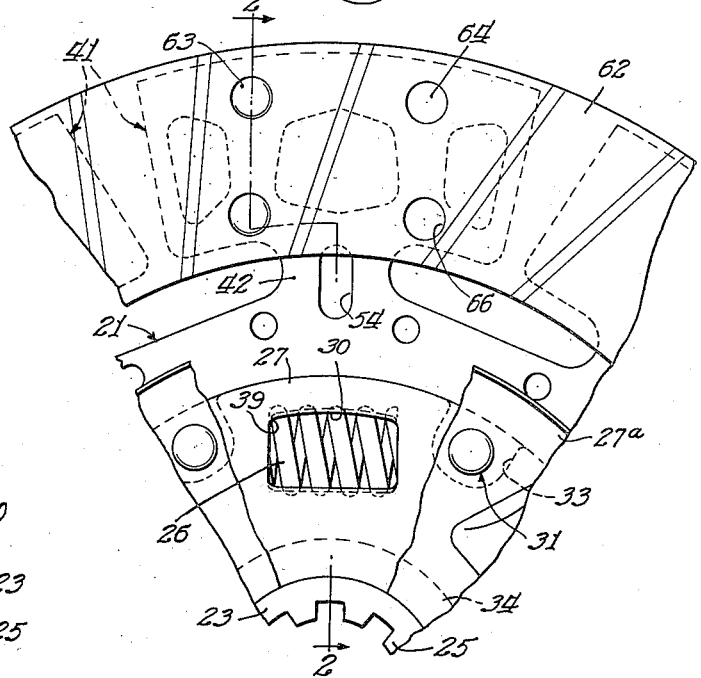
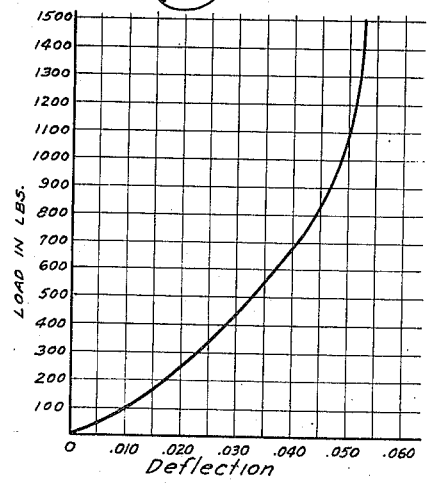
Inventor:
Reinhold C. Zeidler
By Edward C. Fritzlaugh
Atty.

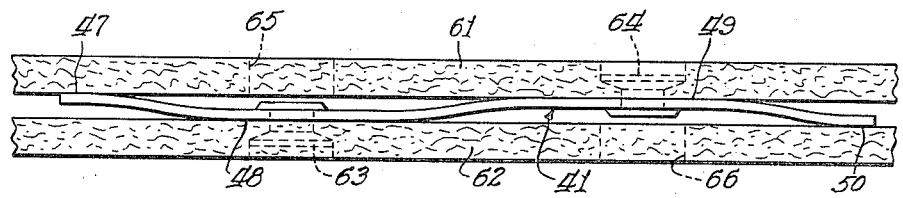
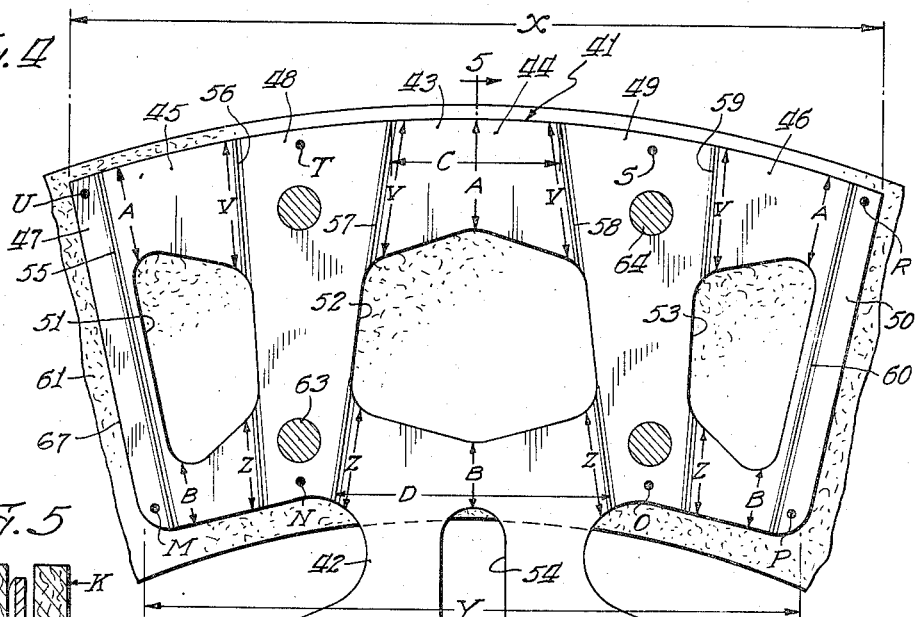
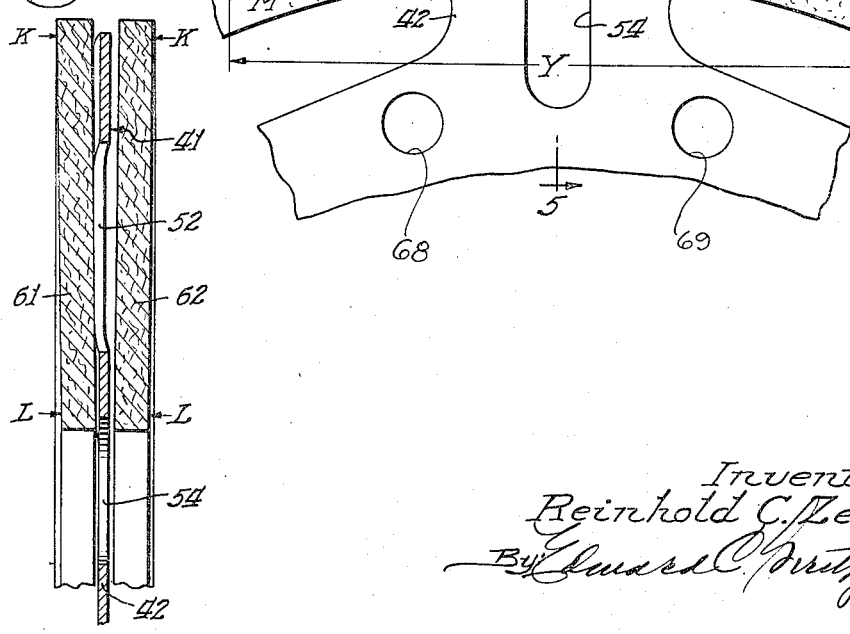

Patented Apr. 3, 1951

2,547,427

UNITED STATES PATENT OFFICE 2,547,427

CLUTCH DISK

Reinhold C. Zeidler, Detroit, Mich., assignor to Borg-Warner Corporation, Chicago, Ill., a corporation of Illinois Application August 15, 1946, Serial No. 690,652

9 Claims. (Cl. 192—107)

The present invention relates to improvements in friction clutches of the type which are adapted primarily, but not exclusively, for use in automotive vehicles and is particularly concerned with the structure and form of clutch discs of the cushion type, which carry the friction elements of the clutch plate driven members and which are adapted to be packed between clutch driving members. In an automotive vehicle, for example, a disc of this type is ordinarily attached to a driven shaft and the disc is engaged with pressure between the engine flywheel and an axially shiftable pressure plate mounted to rotate with the flywheel, the flywheel and pressure plate constituting driving members.

An object and accomplishment of the invention is to provide a novel clutch disc with friction elements which will take hold smoothly and evenly when pressure is initially applied and by a yielding, but rapid progressive action will make the clutch act quickly and efficiently without grabbing or jerking.

As a further object, the invention comprehends the provision of a clutch disc of adequate strength for incorporation in high powered motor vehicles and which has requisite flexibility in its outer zone for yieldingly supporting clutch friction elements or facings and is adaptable to be attached to a hub structure, which hub structure may embody a vibration dampening arrangement.

Another object of the invention is to provide for engagement between the friction elements and the driving and driven members throughout the application of pressure to secure maximum efficiency in a rapid progressive movement and without uneven wear on the friction elements.

A further object of the invention is to provide a novel driven plate of simple, light, yet substantial construction, which will give long and efficient service and which will reduce spinning movement and thereby facilitate easy shifting of gears.

Another object of the invention is to provide a driven plate of simple construction and having relatively and yieldingly movable parts whereby to permit the clutch to take hold smoothly, evenly, and quickly, and without setting up vibrations in the clutch and without carrying forward engine vibrations to the transmission.

A feature of the invention is to avoid the effect of localized high pressure areas in the clutch facings by providing for an even progressive distribution of the yielding effect in the outer zone of the driven plate disc over the entire surface of the friction elements, A further object of the invention is to enable initial contact of the outer edges of the two friction elements with the gripping or clamping parts of the driving member and a gradual progressive increase of contact radially of the facings of the friction elements as the pressure plate load is increased.

The invention has, for a further object, the provision of a clutch disc having its outer zone or so-called rim section arranged to have yielding elements which resist the compressing action of the facings, and these elements are incorporated directly in the material which forms the body of the disc.

Another object of the invention is to provide a clutch disc structure which has in its rim section the characteristic of being yieldably compressible and which has portions which yield, or flex in such compressing action, but which is constructed in one piece, thus facilitating easy manufacture and assembly and reducing manufacturing costs.

In present day automobiles the trend is toward larger and more powerful engines. Accordingly, some of the clutch parts must of necessity be made larger and heavier to transmit power from a larger engine, and also some of the other power transmitting parts may be made heavier and stronger including some of the gears in the transmission.

It will be appreciated by those skilled in the art that a driven member of the clutch is connected directly to certain of the gears in the transmission and that shifting of the gears in the transmission is effected by first releasing the clutch so that the driven member and the gears directly associated therewith, are free from the driving parts of the clutch. When the driven parts of the clutch, or the other driven parts associated therewith, are increased in weight and strength their momentum correspondingly increases so that when the clutch is released, the driven member of the clutch and the gears in the transmission continue to rotate, with the result that it is difficult to shift the gears.

For example, when an automobile is started in low gear, the clutch and the gears associated therewith in the transmission are rotated at a relatively high speed. When the clutch is released to shift gears, however, the continued rotation of the driven part of the clutch and gears, by reason of momentum, makes for difficult shifting and in many cases, clashing of the gear teeth.

Accordingly, it is advantageous to make the driven discs light, as this reduces the weight and resultant momentum of the driven parts, thus minimizing the tendency of continued rotation of the driven parts after release of the clutch. This facilitates gear shifting.

The present necessity of making clutch discs larger and stronger to accommodate the trend toward higher horse power engines, has presented an acute problem of flexibility of the clutch discs particularly in its outer zones; the flexibility of the disc in its outer zone provides a cushioning effect of the clutch plate to damped vibrations and to prevent chattering of the clutch.

In the designing of a clutch disc, in order to obtain smooth engagement when starting up from stand-still, it is desirable to have the rim section of the disc to which the friction facings are attached formed in such a manner so that application of the load of the clutch pressure springs causes gradual flattening out of this form. This form must be of a nature so that the facings are properly supported with a maximum amount of supporting area during the initial flattening out of the disc.

Clutch plates have heretofore been made in various forms and they usually comprise a metal disc made fast to a hub and friction facings secured to the disc on opposite sides thereof adjacent the periphery of the disc and adapted to be located between the clamping parts of the driving member.

In one type of disc the desired flexibility in the rim section is obtained by grinding this portion only to a close tolerance reducing its thickness substantially. An example of this is a disc made of .050 inch thick sheet steel with the rim section reduced to .033 inch by this method.

In another disc the flexibility in the rim section is obtained by letting this section be comprised of a number of individually formed spring steel segments of about .020 inch thickness having legs extending inwardly of the friction facings and riveted to an intermediate plate of substantial thickness giving it the necessary strength to withstand failure.

Other types of discs consist of plates as large in diameter as the outside of the friction facings having attached to one side in the rim section a series of spring steel segments or cushions of various designs and forms with usually one facing attached directly to the plate and the other attached to the cushions.

It is an object of this invention to eliminate expensive grinding operations as well as the need for elaborate equipment; a further object is the elimination of additional parts in the form of individual segments, rivets and subsequent assembly labor involved.

Accordingly, the present invention contemplates a clutch disc formed by cold rolling the material to a suitable thickness, such as .040 to .043 or if necessary, to even closer tolerance or other thickness. This rolling operation would be performed by the supplier of the sheet steel of whom there are many skilled in the art of producing high carbon sheet steel to close thickness tolerances at economical cost. The thickness of the material is the same all over, thereby permitting a disc of adequate thickness and strength to be selected and the flexibility in the rim section being achieved by an improved relative disposition and shape of the perforations in the rim section and by the form produced in the rim section.

Other objects, features and advantages of the invention will be apparent from the following description and the accompanying drawings, in which similar characters of reference indicate similar parts throughout the several views.

Referring to the two sheets of drawings accompanying the specification:

Fig. 1 is a fragmentary elevational view of a clutch driven plate embodying the invention;

Fig. 2 is an axial sectional view taken substantially as indicated by the line 2—2 of Fig. 1;

Fig. 3 is a fragmentary view looking at the periphery of the clutch driven plate depicted in Fig. 1;

Fig. 4 is an enlarged elevational view of one sector of the outer zone of the disc;

Fig. 5 is a fragmentary sectional view taken substantially on the line 5—5 of Fig. 4; and Fig. 6 illustrates a deflection curve obtained with the disc constructed in accordance with this invention.

In an exemplary embodiment of this invention, depicted in Figs. 1 and 2, a clutch driven member, which is designated in its entirety by the numeral 20, comprises in general a metal disc 21 having fixedly secured thereto friction elements or facings 22 which are adapted to be packed between conventional driving members (not shown) of a friction clutch. The inner zone of the disc 21 is mounted upon a hub 23 which may have an integrally formed flange 24 and splined as at 25 for attachment to a driven shaft (not shown).

A vibration dampening structure is associated with the disc 21 and the flange 24 to provide a flexible driving arrangement between them. For this purpose the disc 21 and the hub 24 may be connected by an arrangement in the form of an annulus of coiled springs 26 located in aligned openings in the disc 21, flange 24 and washer 27. The openings in the disc are shown at 28. The openings in the flange are shown at 29, and the openings in the washer are shown at 30. The disc 21 and washer 27 are connected together for movement in unison, and to this end they may be joined by long rivets 31 (Fig. 2) having an enlarged center portion 32 for maintaining the disc and washer in parallel planes in spaced relationship to each other. The rivets 31 also carry an oil shield 27a. The rivets 31 may pass through notches 33 in the hub flange 24 with considerable clearance to permit relative movement between the disc and the washer on the one hand and the hub on the other, as the springs are flexed.

This movement may be controlled and dampened by friction material 34 disposed between the disc and the hub flange and between the washer and the hub flange. Driving forces are transmitted from the disc 21 to the hub 23 and vice versa through the coil springs 26, and when they flex there is a spring loaded friction action afforded between the friction material 34.

It will be observed that the openings 28, 30 in the disc and washer respectively, have a radial dimension less than the diameter of the spring, and accordingly the springs are held in the aligned apertures.

The coil springs, of course, are of high carbon steel, and in order to provide a substantial factor for the holding of the springs in the aperture, the disc 21 and the washer 27 are preferably of high carbon heat-treated steel so as to minimize wear tending to enlarge the apertures therein, such an enlargement may allow the springs to fall out. Moreover, the apertures in the disc and washer are so formed, preferably, as to provide a surface contact with the spring, and for this purpose the walls of the apertures are inclined as at 37 and 38 (Fig. 2) at their upper and lower edges. The apertures 29 in the flange 24, however, need not be so constructed, since the walls thereof have no scrubbing or rubbing action on the spring, but merely abut against the spring ends. It will also be observed that the radially outward wall of the apertures in each member is of curved formation, advantageously curved on an arc around the hub center, so that sufficient clearance is afforded in order that there will not be a binding action on the spring convolutions when the same are flexed. The springs 26 are of straight and cylindrical form in overall dimensions and when one end is picked up by a driving or vibration force and shifted relative to the walls of the apertures the same moves in an arc around the center, and the outside walls of the apertures may be formed on a paralleling arc to maintain clearance.

Preferably, the springs are under some compression when the apertures are in alignment, and as a result the springs 26 are tensioned more in their portions radially removed from the axis of rotation than in the portions next adjacent the axis of rotation; this accordingly tends to urge the springs bodily inwardly, thereby overcoming a centrifugal force, tending to throw the springs radially outwardly. Accordingly, the springs 26 are positioned in a more or less neutral manner in the apertures and scrubbing or rubbing between the springs and the outer walls in the apertures due to centrifugal force is minimized.

In the arrangement shown herein, six coil springs 26 are used in the annulus, and in structures of higher torque capacity, eight or ten, or more, springs may be required. Preferably, the corners of the apertures are somewhat rounded, as at 39, and this may be in the hub flange 24, disc 21, and washer 27, to minimize any tendency of the metal to crack or split at these points. Moreover, it is preferable that the end convolutions of the springs 26 be rounded off at the edges which would tend to cause excessive wear on the walls of the apertures.

The assembly hereinbefore described is very easily made, as the parts may be properly positioned, the springs inserted in the apertures, and the several rivets connecting the parts spun over to complete the assembly. This eliminates any threading operation which is necessary where the springs are held in place by strips, wires or elements threaded through the springs.

Having thus described one form of vibration dampening arrangement which may be advantageously employed in the present invention, the disc 21 and its construction and form will now be described in detail.

Referring to Figs. 1 and 4, the disc body advantageously is of spoke construction, particularly in its outer zone. As illustrated in Fig. 4, the spokes are in the form of cushion members generally indicated in their entirety by the numeral 41 and each having a neck 42 and an enlarged head 43. The head 43, as illustrated, may be visualized as having three portions, namely, a center portion 44 and end portions 45 and 46 on opposite sides thereof all disposed obliquely to the inner zone of the disc 21. The end portion 45 is provided with lands 47 and 48 and the end portion 46 is provided with lands 49 and 50. Disposed between adjacent lands are openings or apertures 51, 52 and 53, and an opening 54 is disposed in the neck portion 42. An important feature of the invention is the specific shape, position, and structure of the lands and the relative disposition of the openings between these lands. The cooperating function of these elements will be hereinafter explained in detail.

According to this construction and arrangement, each spoke or cushion member has a twisted or oblique formation 44 substantially centralized on a radial line therein through the center of the neck portion 42. Between the center portion 44 and the end lands 47 and 50 are bend lines 55—60, arranged so that the lands 47 and 49 and the lands 48 and 50 increase in height in a radially outward direction and are disposed in planes slightly off parallel to the plane of the disc. Meaning that while the land surfaces in themselves are substantially flat they lie in conical relation with each other with every other one tapered in one direction and those in between being tapered in the opposite direction thus giving in effect a series of concave surfaces on each side of the disc. The lands 47 and 49 lie in one common plane and the lands 48 and 50 lie in another common plane, with the common planes diverging outwardly in a region beyond the inner zone of the disc 21. Surfaces 47 and 49 would have the same relation to the body of the disc as surfaces 48 and 50 but would be axially removed to opposite sides thereof. While surfaces 47, 48, 49 and 50 are flat within themselves and taper in a conical radial manner, connecting surfaces 44, 45 and 46 are not flat in themselves but have a variable taper in a circumferential direction. For example surface 44 across C has a much greater taper than at D because C is shorter and the height between T and S is greater. In the actual formation, the bend lines do not appear abrupt, but appear a good deal like the illustration shown in Fig. 3. The shading in Fig. 4 is slightly exaggerated to demonstrate the formation.

Two friction facings 61 and 62 are fixedly secured to the disc, one on one side and one on the other. The friction facing 62 is secured to the land 48 as, for example, by suitable rivets 63. The friction facing 61 is secured to the land 49 by similar rivets 64. It is notable that each spoke is formed like the one just described, so that respective lands of each spoke project to the same side of the center plane of the disc and are in a position to be secured to the facings in like manner as hereinbefore described.

The facing 61 may be provided with clearance apertures 65 for the heads of the rivets 63, and the facing 62 may be provided with clearance apertures 66 for the rivets 64.

According to this construction and arrangement of parts the facings 61 and 62 are normally held in axially spaced relation, but they are capable of moving toward each other as the disc is collapsed or compressed incident to being packed by the clutch driving members.

Referring to Fig. 4, the shape and position of the perforations or apertures 51, 52 and 53 is such that the width A at the outer edge is greater than B at the inner edge, and this is relative to the difference in the width of the spoke X, measured circumferentially along the outer peripheral edge, as compared to Y, measured along the inner peripheral edge. In other words, X is longer than Y and if the width A were the same at the outside as it is at the inside as at B, it would result in the outer portion of the disc being considerably softer than the inner portion, with the result that the relative resistance to flattening out would be greater at the inside and would show a heavier wear pattern at the inner diameter of the friction facings. By making the dimension A greater at the outside than B, the resistance to flattening out is just slightly greater at the outside than at the inside.

It is important that these perforations 51, 52 and 53 do not cut through that portion of the disc which supports the facings, in other words, the lands 47, 48, 49 and 50. These lands are the principal supporting surfaces for the friction facings. As engagement of the clutch progresses the unit pressure between the lands and the backs of the facings increases proportionately reaching a maximum when the rim section becomes substantially flat under full spring load. It is only at this time that surfaces 44, 45 and 46 have any appreciable contact with the facings and this is only under relatively light unit pressure. It should be noted that the shape of the perforations produce arms of a variable width, so that the distribution of stresses due to bending when flattening are more uniform. This is illustrated by the width of the arm at V being greater than at A and at Z being greater than at B. The additional perforation 54 in the neck 42 of the spoke 41 is to reduce the stiffness at this point to lessen torsional resistance.

Referring to Fig. 4, apertures 68 and 69 are provided as a convenient means to permit attaching of balance correction weights (not shown). Two of these apertures are provided in the disc body at each of the T-shaped spokes as shown.

In many of the prior art structures, the neck of the spoke is so constructed to deliberately build up a torsional resistance to aid in the resistance to the deflection of the rim section. In the present invention, no torsional resistance from the neck is desired, and an effort is made to reduce this to a minimum—hence, the additional perforation 54.

According to this construction and arrangement of parts, it is notable that when the disc is placed on a flat surface, points S and U contact the surface, while the points O and M are slightly raised, or higher. Likewise, if an indicator were put on the points T and R, then again at N and P, it would be found that the two latter points are slightly lower. In other words, the form height, or the distance from the lowest to the highest measured point around the outer peripheral edge of the disc, is considerably greater than the same measurements taken around the inner portion of the disc. It is notable that these measurements will be approximately the same whichever side of the disc is upward indicating that both sides are in effect concave and symmetrical. This is illustrated in Fig. 5 wherein the distance between the points K—K is greater than the distance between the points L—L. In placing a straight edge across either of the facings, it will be noted that the facings, which are normally flat, have been caused to become slightly concave due to the form in the disc. This formation gives what might be termed a "rolling in" action, and helps to give the desired softness under light loads. By varying the amount of taper in the lands 47 to 50, the degree of flexibility is likewise varied. Moreover, this form assists in obtaining a heavier wear pattern on the friction facings toward the outer diameter. Actual experience indicates that smoother engagement and better performance is obtained if the wear pattern is heavier toward the outside rather than toward the inside. Measured circumferentially, more facing area exists at the outside; and with the higher unit pressures nearer the outside, greater torque capacity is obtained from a given diameter of clutch. It is not important to have full contact at initial engagement; in fact progressive contact is preferred since it will aid in obtaining quick release. Therefore, the tapered construction set forth above will allow the clamping members of the clutch to initially contact with the facings at the outer edges thereof and this contact will progressively increase radially of the facings with the increase of pressure of the clamping members.

In the past it has been found in some installations where the facings make full initial contact, there is a tendency for the facings to adhere to the driving surfaces causing spin or drag when the clutch is released. This adherence is similar to what occurs when Johansson gage blocks are rubbed together.

The lands, although higher at the outside than the inside, are otherwise relatively flat in themselves and constitute the supporting area for the two friction facings 61 and 62, which are independently riveted to the disc. During the initial engagement of the clutch, when slippage is actually taking place, the form in the rim section is only partly flattened out, so that these same areas, whether or not perforated, would still be the principal support for the friction facings. As engagement progresses and the disc becomes substantially flat, these supporting areas or lands increase slightly in width so that in effect, the perforations begin to overlap into the supporting area. However, it is important to understand that at this stage of engagement relative slippage between the friction facings and the flywheel and pressure plate surfaces has almost ceased, so that the question of facing support at this stage is not too important.

It will be noted that the form height from point S to point T may be approximately .058 while from O to N would be .039. The lands are tapered from outside to the inside while the areas between are tapered both from the outside to the inside as well as transversely. Therefore, the dimension C, as measured at the outside, has a much higher degree of taper than the dimension D measured at the inside. This lesser degree of taper at the inside, plus the addition of the perforation 54, reduces the torsional resistance of the neck of the spoke to such an extent that it has very little influence on the overall stiffness at the inner portion of the spoke. The stiffness then at this point is controlled almost entirely by the width and length of the arms B and Z.

In the present arrangement, a greater number of cushion members of the type hereinbefore described may be disposed in annular array on a given radius, and this provides an increased number of points or locations of support for the facings. These points or locations yieldably resist compression action during clutch engagement, and as a result there is an increased area on the facings which resist compression, and a correspondingly decreased unit pressure. The structure of the present invention contributes to a smoothly acting clutch and decreases a tendency for the clutch to chatter or grab during clutch engagement.

Moreover, the distance between points of support may be of adequate length without decreasing the number of supporting points. It will be understood, of course, that where the distance between supporting points is short resistance to flexure is increased. As a result, the stock of which the disc member is made, need not be so thick, and, accordingly, the desired type and gauge of stock may be employed.

Now as the clutch disc of the present invention is engaged, the facings approach each other and with lands 47 and 49 contacting one facing and 48 and 50 contacting the other facing there is a bending action tending to flatten out the spoke head. Preferably each spoke head is formed so that its width measured circumferentially in its outer zone is greater than its width in its inner zone. Also the side edges 67 are straight as shown to insure more uniform contact with the facings to effect the best wear pattern.

Another important advantage of the structure of the spoke of the present invention is that it reduces the moment of inertia of the clutch disc in operation. When a quick gear shift is made, so that there is practically no change in car speed during the shifting period, the speed of the driven member, after the clutch has been released, must be changed quickly to correspond to the new gear ratio. With modern passenger car transmissions, this change is assisted by synchronizing devices. If the gears are engaged while not in synchronism, an impact is produced on the engaging surfaces, gear teeth or clutch jaws, and the magnitude of this impact also depends upon the moment of inertia of the clutch driven member. A low moment of inertia of the clutch member, therefore, makes for easy shifting and quiet operation. Since the moment of inertia is equal to the sum of the products of all mass particles into the squares of their distances from the axis, it is particularly important to keep down the weight in the rim. This is accomplished in the present invention by judicious placement of the perforations which not only cut down the weight in the rim section, but also assist in the deflection pattern of the rim section.

In the clutch disc of this type it is desirable, that initial compression takes place against a relatively low resistance, but wherein the resistance increases as the compression of the disc continues. A curve plotted to show this desired characteristic is one which is relatively soft or flat in the early stages of clutch engagement and such a curve is illustrated in Fig. 6. In referring to the plotted curve depicted in Fig. 6, it is notable that the curve is fairly soft initially, and, in fact, a load of about 500 pounds causes a deflection of approximately .035 of an inch. At about 1,500 pounds of load, the deflection has increased to approximately .055 of an inch, it being apparent that the final 1,000 pounds of load increases the deflection only about .020 of an inch.

In the present design, the deflection pattern is controlled (1) by the relative disposition and shape of the perforations in the rim section, (2) by the form produced in the rim section and (3) by the thickness of the material. Once number (1) is determined for a given diameter of disc it becomes an easy matter to vary the deflection characteristics by changing the form or easier still by just changing the thickness. Ultimately, the spokes in their bent formation will be packed between the facings and then upon the application of increased clutch pressure the tendency is to flatten out the bend formations of the spokes. It is the progressive bending action across the width of the spoke from the outer zone under initial load to the inner zone under heavy load which produces the character of curve as plotted in Fig. 6. A total deflection of approximately .055 of an inch, as shown in Fig. 6, is about the maximum deflection desired, and, in fact, in many instances the clutch will be constructed to give a total deflection of less than .055 of an inch, although the curve shown illustrates the point in mind.

In the form of clutch disc 21 of the present invention, a good wear pattern on the facing is provided because of the many points of support given to the facings and because the supports extend substantially completely across the facings from the inner to the outer peripheral edges. Although the clutch disc 21 illustrated herein has been described as having eight spokes, any number of spokes may be employed as desired. Where eight spokes are employed, sixteen initial supporting lands for each facing are provided with the supports alternating on the facings and extending substantially completely across the facings. The spoke heads 41 act as units in their entirety as differentiated from struck out tongues or portions as found in prior art construction; this contributes to the obtaining of a satisfactory wear pattern. In this matter of construction there are no localized points or spots which essentially support the facings and which would be designed to give a bad wear pattern. The discs 21 of the present invention may be varied or modified to obtain different deflection curves in order that the most satisfactory clutch disc may be selected for a particular vehicle or model of that vehicle by merely selecting the proper thickness of disc stock. The shape and form of each disc being the same would necessitate only one stamping fixture for all the different designs. This is a great saving in expense and time.

It will, therefore, be seen that the present invention provides a clutch disc which obtains a desired deflection curve and at the same time this is accomplished without the use of separate spring inserts and other expensive features found in prior art structures. In fact, a minimum number of parts are required, namely, the disc 21 itself and two facings. Of course, the invention can be used without the vibration dampening hub construction hereinbefore described, in which event the disc 21 may be fastened directly to the hub. Thus the invention not only provides a structure wherein a desired nicety of deflection is obtained, but at the same time provides a clutch member uniformly simple in construction and composed of a minimum number of parts.

The advantages of the present clutch disc may, therefore, be summarized as follows:

1. Capable of picking up its load smoothly, evenly, and without grab or chatter;

2. Low moment of inertia to permit easy gear shifting;

3. Dampens out any vibration of the crankshaft to prevent gear clatter;

4. Easily varied to suit a particular make of vehicle;

5. Economical to manufacture; one piece construction;

6. Facings can be readily serviced in the field.

While I have illustrated a preferred embodiment of my invention, many modifications may be made without departing from the spirit of the invention, and I do not wish to be limited to the precise details of construction set forth, but desire to avail myself of all changes within the scope of the appended claims.

I claim:

1. A clutch driven member comprising axially spaced friction facings; a disc having an inner zone adapted for connection to a hub, and having an outer zone adapted to support said facings, said outer zone being defined by a plurality of cushion members each comprising a circumferentially extending body portion lying between said facings, and a neck connecting said body portion to the outer periphery of said inner zone of the disc, each cushion member having a central section lying in a plane oblique to the plane of said inner zone and having an aperture therein with circumferentially spaced side edges said aperture occupying a substantial portion of the area of said central section, first and second radial lands at the opposite circumferentially spaced side edges of said aperture and having radial sides terminating at said aperture side edges so that the sides with portions thereof of said lands are not interrupted by said aperture, said lands lying in planes which are axially spaced from said plane of said inner zone; third and fourth radial lands at the end regions of each cushion member having radial sides and being spaced circumferentially from said first and second lands, said third and fourth lands lying in planes which are axially spaced from said plane of said inner zone, said first and third lands lying in a common plane and contacting one of said facings, and said second and fourth lands also lying in a common plane spaced from said last-mentioned plane and contacting the other of said facings, and two circumferentially spaced sections in each cushion member between which said central section and the respective first and second lands are disposed, each of said two sections being disposed between and connecting two adjacent radial lands and being spaced from the friction facings and arranged in a plane oblique to the plane of said inner zone, each of said two sections having an aperture therein occupying a substantial portion of the area thereof and the aperture having circumferentially spaced side edges terminating at the sides of the two adjacent radial lands so that the sides of the lands are not interrupted by the aperture; and means securing one of the lands contacting one friction facing to said one friction facing and means securing one of the lands contacting the other friction facing to said other friction facing.

2. A clutch driven member comprising axially spaced friction facings; a disc having an inner zone adapted for connection to a hub, and having an outer zone adapted to support said facings, said outer zone being defined by a plurality of cushion members each comprising a circumferentially extending body lying between said facings, and a neck connecting said cushion body to said inner zone of the disc, each cushion member having a central portion arranged in a plane oblique to the plane of said inner zone and spaced from said friction facings and having an aperture therein radially aligned with said neck, said aperture having circumferentially spaced side edges and occupying a substantial portion of the area of said central section, radially extending portions lying in planes oblique to the plane of said inner zone and being spaced circumferentially from said central portion and also spaced axially from said friction facings and having apertures therein with circumferentially spaced side edges with said apertures occupying a substantial portion of the area of said radially extending portions, radial lands intermediate and connecting said central portion and respective of said radially extending portions and having radial sides with portions thereof terminating at one of the circumferentially spaced side edges of said apertures in said central portion and radially extending portions, respectively, so that the sides of the lands are not interrupted by said apertures, and radial end lands circumferentially spaced from but connected to said radially extending portions and having radial sides with portions thereof terminating at the other of the circumferentially spaced side edges of said last-mentioned apertures so that the sides of said end lands are not interrupted thereby, one of said radial intermediate lands and one of said end lands lying in a common plane and engaging one of said friction facings and the other of said radial intermediate and end lands lying in a common plane and engaging the other of said facings; and means securing one of the lands engaging one friction facing to said one friction facing and means securing one of the lands engaging the other friction facing to said other friction facing.

3. A clutch driven member as defined in claim 2, in which the inner zone of the disc is disposed in a plane transverse to the axis of rotation thereof and in which the common plane of the one end land and the one intermediate land is on one side of and inclined in one direction relative to the plane of said inner zone, and in which the common plane of the other end land and the other intermediate land is on the other side of and inclined in an opposite direction relative to the plane of said inner zone, the directions of the said common planes of said lands diverging outwardly in a region radially beyond said inner zone, whereby the outer faces of the friction facings engaged thereby normally assume a slightly concave shape when not under clutch engaging pressure.

4. A clutch driven member comprising axially spaced friction facings; a disc having an inner zone adapted for connection to a hub, and having an outer zone adapted to support said facings, said outer zone being defined by a plurality of cushion members each comprising a circumferentially extending body lying between said facings, and a neck connecting said cushion body to said inner zone of the disc, each cushion member having a central portion arranged in a plane oblique to the plane of said inner zone and spaced from said friction facings and having an aperture therein radially aligned with said neck, radially extending portions lying in planes oblique to the plane of said inner zone and being spaced circumferentially from the sides of said central portion and also spaced axially from said friction facings and having apertures therein, all of said apertures having circumferentially spaced side edges, radial lands intermediate and connecting said central portion and respective of said radially extending portions and with portions of said lands terminating at the circumferentially spaced side edges of said apertures and not being interrupted thereby, and radial end lands circumferentially spaced from but connected to said radially extending portions and with portions of said last-mentioned lands terminating at the adjacent side edges of the apertures therein and not being interrupted thereby, one of said radial intermediate lands and one of said end lands lying in a common plane and engaging one of said friction facings and the other of said radial intermediate and end lands lying in a common plane and engaging the other of said facings, the aperture in each of said radially extending portions having radially extending side edges of different lengths to provide circumferentially tapered radially spaced inner and outer arm portions converging toward the aperture of said central portion and connecting a radial intermediate land to an end land; and means securing one of the lands engaging one friction facing to said one friction facing and means securing one of the lands engaging the other friction facing to said other friction facing.

5. A clutch driven member as defined in claim 4, wherein the central oblique portion converges radially outwardly of said disc and the radially extending oblique portions and intermediate lands converge radially inwardly toward the inner zone of the disc.

6. A clutch driven member comprising axially spaced friction facings; a disc having an inner zone adapted for connection to a hub, and having an outer zone adapted to support said facings, said outer zone being defined by a plurality of cushion members each comprising a circumferentially extending body lying between said facings, and a neck connecting said body to the outer periphery of said inner zone of the disc, the body of each cushion member having a radially extending central portion arranged in a plane oblique to the planes of said disc and said facings and spaced from said facings, said central portion having an aperture therein providing radially spaced inner and outer parts in said central portion, radially extending oblique side portions spaced circumferentially from said central radial portion and axially spaced from said friction facings and each having a radially elongated aperture therein providing radially spaced inner and outer parts in said oblique side portions, radial intermediate lands between said central portion and said oblique side portions and connecting said radially spaced inner and outer parts of said central and oblique side portions, and radial end lands connected to said radially spaced inner and outer parts of said oblique side portions, each of said apertures having side edges extending radially and terminating at and being defined by the edges of the lands adjacent thereto, one of said intermediate lands and one of said end lands lying in a common plane parallel to one of said facings and engaging said one facing and the other of said intermediate and end lands lying in a common plane parallel to the other of said facings and engaging said other facing; and means securing one of the lands engaging one friction facing to said one friction facing and means securing one of the lands engaging the other friction facing to said other friction facing.

7. A cushion device for use in a friction clutch, comprising: a resiliently metal member having an elongated body and a neck extending from one longitudinal edge thereof and a flat attaching portion integral with said neck for connecting the same with a support, said elongated body portion having a transversely extending land at each end thereof and two intermediate transversely extending lands spaced from each other by a central section and respectively spaced from said end lands by an intermediate section, all of said lands having substantially straight uninterrupted side edges and bend lines, said central section lying in a plane oblique to the plane of said flat attaching portion and having a circumferentially elongated aperture extending thereacross with two of the opposite sides of said aperture defined by the adjacent straight side edges of said intermediate lands, said intermediate sections respectively lying in planes oblique to the plane of said flat attaching portion, each of said intermediate sections having a radially elongated aperture extending thereacross with opposite sides of said apertures defined by the adjacent straight side edges of an end land and an intermediate land, one end land and the intermediate land most remote therefrom being disposed in a substantially common plane and adapted to engage a first friction facing and the remaining end land and intermediate land being disposed in a substantially common plane axially spaced from said first-mentioned common plane and adapted to engage a second friction facing.

8. A cushion device as defined in claim 7, in which the lands gradually increase in height in a direction away from the longitudinal edge of the body portion having the neck extending therefrom.

9. A cushion member as defined in claim 7, in which all of the lands gradually increase in height in a direction away from the longitudinal edge of the body portion having the neck extending therefrom and in which the intermediate lands gradually increase in circumferential width in the stated direction.

REINHOLD C. ZEIDLER.

REFERENCES CITED

The following references are of record in the file of this patent:

UNITED STATES PATENTS

| Number | Name | Date |
|---|---|---|
| 1,659,289 | Gamble | Feb. 14, 1928 |
| 2,277,603 | Nutt et al. | Mar. 24, 1942 |
| 2,283,113 | Wemp | May 12, 1942 |
| 2,307,006 | Wemp | Dec. 29, 1942 |

FOREIGN PATENTS

| Number | Country | Date |
|---|---|---|
| 499,881 | Great Britain | Jan. 31, 1939 |